United States Patent
Hillen et al.

(10) Patent No.: US 9,574,475 B2
(45) Date of Patent: Feb. 21, 2017

(54) METHOD OF OPERATING AN INTERNAL COMBUSTION ENGINE

(71) Applicant: GE Jenbacher GmbH & Co OG, Jenbach (AT)

(72) Inventors: Friedhelm Hillen, Jenbach (AT); Manickam Bhuvaneswaran, Rattenberg (AT); Arne Bienholz, Darmstadt (DE)

(73) Assignee: GE JENBACHER GMBH & CO., OG, Jenbach (AT)

( * ) Notice: Subject to any disclaimer, the term of this patent is extended or adjusted under 35 U.S.C. 154(b) by 0 days.

(21) Appl. No.: 14/733,080

(22) Filed: Jun. 8, 2015

(65) Prior Publication Data

US 2015/0361843 A1  Dec. 17, 2015

(30) Foreign Application Priority Data

Jun. 12, 2014  (AT) ...................... 467/2014

(51) Int. Cl.
*F01N 3/00* (2006.01)
*F01N 3/08* (2006.01)
(Continued)

(52) U.S. Cl.
CPC ............... *F01N 3/0835* (2013.01); *F01N 3/20* (2013.01); *F01N 3/2033* (2013.01); (Continued)

(58) Field of Classification Search
USPC ................. 60/274, 280, 286, 287, 288, 292, 295,60/303, 324, 605, 606, 614
See application file for complete search history.

(56) References Cited

U.S. PATENT DOCUMENTS 3,163,984 A * 1/1965 Dumont .................... F01N 3/32
  60/290
4,464,901 A * 8/1984 Kobayashi ............ F02B 37/166
  60/606
(Continued)

FOREIGN PATENT DOCUMENTS

CA    2 453 689    9/2004
DE  10 2006 037 649   2/2008
(Continued)

OTHER PUBLICATIONS

Austrian Office Action issued in connection with corresponding AT Application No. 1AA467/2014-1 on Jun. 25, 2015.
(Continued)

*Primary Examiner* — Binh Q Tran
(74) *Attorney, Agent, or Firm* — Wenderoth, Lind & Ponack, L.L.P.

(57) ABSTRACT

A method of regenerating an oxidation device (3) of an internal combustion engine (1), in particular a stationary internal combustion engine, wherein the oxidation device (3) is connected downstream of the internal combustion engine (1) and wherein a mixture of combustion gas and exhaust gas can be fed to the oxidation device (3) to increase a temperature in the oxidation device (3) and wherein exhaust gas can be passed around the oxidation device (3) by way of a bypass conduit (4), wherein the amount of exhaust gas passed around the oxidation device (3) by way of the bypass conduit (4) is controlled in open-loop or closed-loop control mode in dependence on an ascertained exhaust gas temperature downstream of the oxidation device (3).

16 Claims, 2 Drawing Sheets

Figure 1:
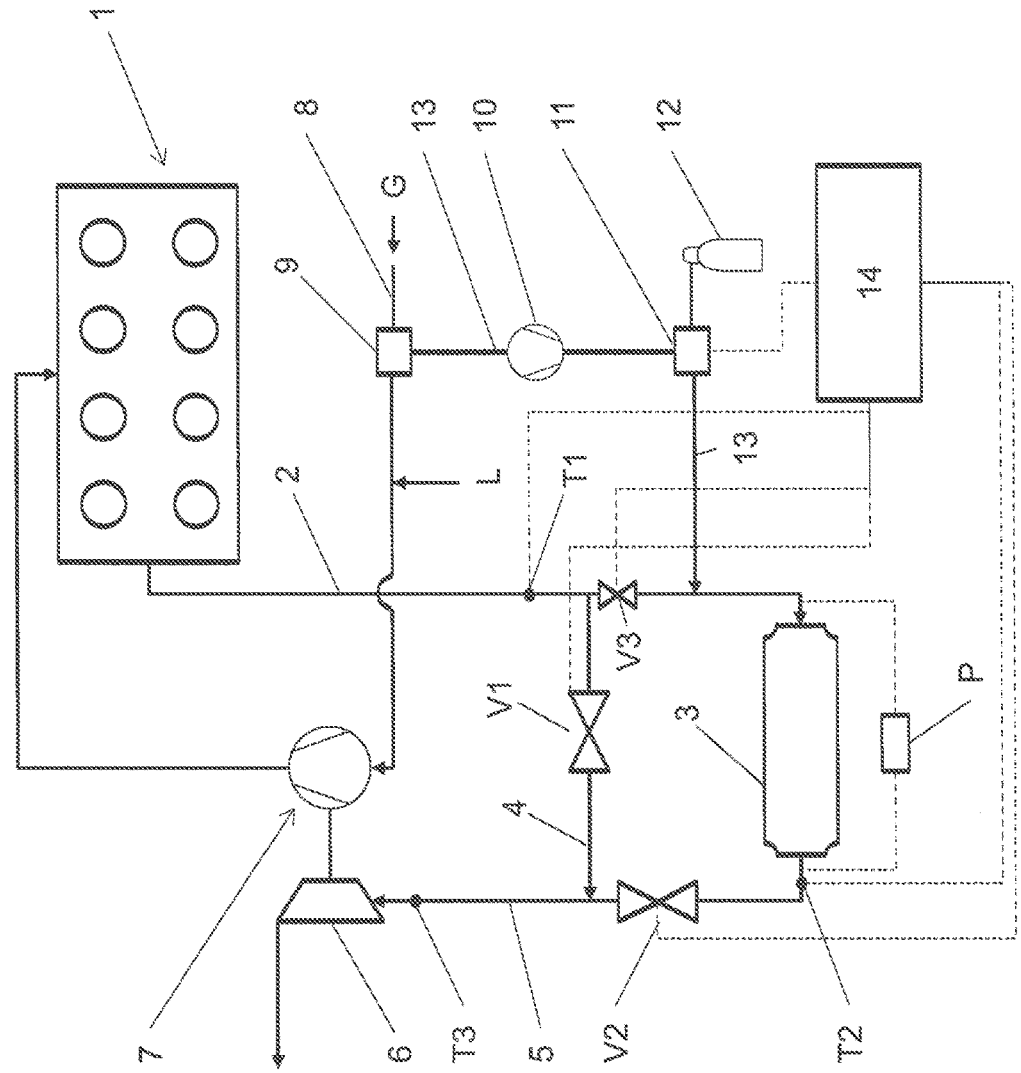

(51) Int. Cl.
  *F01N 3/20*   (2006.01)
  *F01N 9/00*   (2006.01)
  *F01N 3/10*    (2006.01)

(52) U.S. Cl.
  CPC .............. *F01N 3/2053* (2013.01); *F01N 9/00* (2013.01); *F01N 3/103* (2013.01); *F01N 2240/14* (2013.01); *F01N 2260/04* (2013.01); *F01N 2260/10* (2013.01); *F01N 2340/06* (2013.01); *F01N 2410/02* (2013.01); *F01N 2560/023* (2013.01); *F01N 2560/06* (2013.01); *F01N 2560/14* (2013.01); *F01N 2590/10* (2013.01); *F01N 2610/03* (2013.01); *F01N 2610/06* (2013.01); *F01N 2900/1402* (2013.01); *F01N 2900/1404* (2013.01); *Y02T 10/26* (2013.01); *Y02T 10/47* (2013.01)

(56) References Cited

U.S. PATENT DOCUMENTS

| | | | |
|---|---|---|---|
| 4,520,624 A * | 6/1985 | Kiyota | F01N 3/0256 55/283 |
| 7,263,824 B2 * | 9/2007 | Bellinger | F01N 3/0231 60/280 |
| 9,103,257 B2 | 8/2015 | Choi | |
| 2003/0106306 A1 | 6/2003 | Nakatani et al. | |
| 2004/0171475 A1 | 9/2004 | Klimstra et al. | |
| 2005/0257516 A1 | 11/2005 | Ancimer et al. | |
| 2007/0220865 A1 | 9/2007 | Cunningham et al. | |
| 2011/0011082 A1 | 1/2011 | Mehta et al. | |
| 2013/0255230 A1 * | 10/2013 | Takeuchi | F01N 3/36 60/274 |
| 2013/0330242 A1 | 12/2013 | Manickam et al. | |
| 2014/0053534 A1 | 2/2014 | Choi | |

FOREIGN PATENT DOCUMENTS

| | | |
|---|---|---|
| DE | 102006037649 A1 | 2/2008 |
| EP | 1 445 439 | 8/2004 |
| EP | 1445439 A1 | 8/2004 |
| JP | 2010-144557 | 7/2010 |
| JP | 2010144557 A | 7/2010 |
| KR | 10-2014-0025677 | 3/2014 |
| WO | 2012/081062 | 6/2012 |
| WO | 2012/123634 | 9/2012 |
| WO | 2012/123636 | 9/2012 |
| WO | 2012123634 A1 | 9/2012 |
| WO | 2012123636 A1 | 9/2012 |

OTHER PUBLICATIONS

Extended European Search Report issued Oct. 30, 2015 in corresponding European Application No. 15 00 1582 with English translation.

* cited by examiner

METHOD OF OPERATING AN INTERNAL COMBUSTION ENGINE

The invention concerns a method of operating an internal combustion engine having the features of the preamble of claim 1. The invention further concerns an exhaust gas aftertreatment apparatus having the features of the preamble of claim 12.

Internal combustion engines are frequently equipped with systems for exhaust gas aftertreatment in order to comply with emission restrictions. Oxidation devices in the form of oxidation catalysts are frequently used to reduce the emission of unburnt hydrocarbons (referred to as total hydrocarbon emissions or THC). As hydrocarbons and methane which is particularly relevant to gas engines can only be oxidized above about 550° C. the catalyst has to be set up upstream of the turbocharger. Downstream of the turbocharger the exhaust gas has given off too much of its enthalpy so that it is no longer possible to achieve satisfactory conversion rates.

Oxidation catalysts frequently have a coating with noble metal—for example palladium—at which conversion of the species to be oxidized takes place.

Unfortunately noble metal catalysts deactivate rapidly when they are used in the exhaust gas flow of internal combustion engines. Such deactivation is caused by sulfur poisoning of the noble metal. Sulfur-bearing components which can originate either from the lubricating oil or from the fuel gas react with the noble metal, and that results in a massive drop in the methane conversion rates. At temperatures of around 700° C. and in the presence of methane or other combustible gases the reaction using the example of palladium and sulfur is reversible and the catalyst can be regenerated.

As however the excessively high component stressing on the turbocharger means that the exhaust gas temperature encountering the turbocharger is restricted to around 650° C. it is not possible to raise the exhaust gas temperature to 700° C., which would be necessary for successful thermal regeneration of the oxidation catalyst.

A number of approaches for the regeneration of oxidation catalysts are known from the state of the art. Thus for example EP 1 445 439 A1 discloses an arrangement in which a reducing gas, for example hydrogen, can be fed to the oxidation catalyst. In accordance with that specification therefore the catalyst is not regenerated thermally but chemically. There is provided a bypass by way of which exhaust gas can be passed around the oxidation catalyst during the regeneration thereof.

WO 2012/123636 proposes that, for the regeneration of the oxidation catalyst, fuel is sequentially introduced into various regions of the oxidation catalyst to avoid temperature peaks in the oxidation catalyst. If sulfur-rich fuel is used then the exhaust gas can be passed around the oxidation catalyst by way of a bypass conduit. As a measure in relation to temperature peaks which occur during regeneration in the oxidation catalyst and which can damage the turbocharger it is proposed that water is sprayed into the exhaust gas tract between the oxidation catalyst and the turbine of the turbocharger.

The object of the present invention is to provide a method which avoids complicated and expensive measures for avoiding temperature peaks in the regeneration of an oxidation device, that can damage the turbocharger.

The invention also seeks to provide an exhaust gas aftertreatment apparatus which avoids the disadvantages of the solutions known from the state of the art.

That object is attained by a method having the features of claim 1 and an exhaust gas aftertreatment apparatus having the features of claim 12. Advantageous embodiments are defined in the appendant claims.

By virtue of the fact that the amount of exhaust gas passed around the oxidation device by way of the bypass conduit is controlled in open-loop or closed-loop control mode in dependence on an ascertained exhaust gas temperature downstream of the oxidation device it is therefore possible to avoid the exhaust gas temperature upstream of the turbocharger assuming values which are damaging to the turbocharger.

More specifically it has been found in the applicant's tests that regeneration of the oxidation catalyst reacts highly sensitively to the methane concentration of the exhaust gas fed to the oxidation catalyst. Thus an increase by only 100 ppm in the methane concentration (or a corresponding methane equivalent) results in a temperature rise of 2.5° C. of the oxidation catalyst. To achieve the conditions necessary for the regeneration of the catalyst it is necessary to set the methane concentration upstream of the oxidation device in the range of between 5000 and 7000 ppm.

If however the total exhaust gas mass flow flowing out of the exhaust gas tract of the engine into the oxidation device were to be at that methane concentration then too much chemical energy would be converted and the temperature downstream of the oxidation device would rise to a degree detrimental to the turbine of the exhaust gas turbocharger. Therefore it is accordingly provided that admittedly the concentration of combustion gas that is required locally in the oxidation device for regeneration purposes is set, but the exhaust gas mass flow is reduced in the oxidation device by diverting a part of the exhaust gases around the oxidation device. Downstream of the oxidation device the two mass flows, that is to say the mass flow portion which is very hot due to regeneration of the oxidation device coming from the oxidation device, and the mass flow portion passed by way of the bypass, that is in fact at the normal exhaust gas temperature of the engine, are brought together again and mixed. As a result the temperature of the exhaust gas flow encountering the turbine is reduced.

The exhaust gas temperature downstream of the oxidation device, in dependence on which the amount of the exhaust gas passed around the oxidation device by way of the bypass conduit is controlled in open-loop or closed-loop control mode can be ascertained by way of measurement and/or calculation.

The method therefore provides that, after mixing of the mass flow portions, that is to say the mass flow portion from the oxidation device, that is very hot due to regeneration of the oxidation device, and the mass flow portion which is passed by way of the bypass, the temperature in the overall mass flow does not exceed a level which is damaging to the turbocharger. If for example an excessively high exhaust gas temperature is established downstream of the oxidation device then the amount of exhaust gas passed by way of the bypass is increased and thus the temperature in the overall mass flow is reduced.

An additional advantage of the method is that the amount of combustion gas, that is required for regeneration, can be markedly reduced. For, for regeneration of the oxidation device, it is the concentration of combustion gas that is locally present there that is crucial and not an absolute amount of combustion gas.

The open-loop or closed-loop control device accordingly adjusts the amount of combustion gas that is meteredly added in dependence on the amount of bypassed gas so that the concentration of combustion gas, that is required for the regeneration operation, in the oxidation device is maintained.

In addition, if the amount of exhaust gas flowing through the catalyst has already reached the lower limit, the concentration of meteredly added methane can be reduced in dependence on the ascertained temperature. The expression the lower limit of the amount of exhaust gas flowing through the oxidation device means that, to ensure a uniform afflux flow to the oxidation device, the exhaust gas mass flow through the oxidation device may not be reduced just as may be desired. It will be appreciated that the methane feed can be interrupted for safety-related reasons if the volume flow through the oxidation device has already reached the lower limit and nonetheless an excessively high temperature is measured.

It can preferably be provided that the exhaust gas temperature downstream of the oxidation device is ascertained by a temperature sensor downstream of the oxidation device and upstream of the entry mouth of the bypass conduit. In this embodiment it is therefore provided that the exhaust gas temperature downstream of the oxidation device is ascertained by measurement. For that purpose the temperature sensor is arranged in the exhaust gas conduit after the oxidation device, but before the entry mouth of the bypass conduit.

The ratio of the mass flow portions (exhaust gas amount through the oxidation device and exhaust gas amount by way of the bypass) is now so adjusted by open-loop control/closed-loop control of the amount of exhaust gas passed around the oxidation device by way of the bypass conduit that the resulting mixture temperature of the combined mass flow portions does not exceed a level damaging to the turbocharger.

In a preferred embodiment it can be provided that that the exhaust gas temperature downstream of the oxidation device is ascertained by a temperature sensor downstream of the entry mouth of the bypass conduit and before the entry mouth into the exhaust gas turbine. Here therefore the exhaust gas temperature is ascertained before entry into the exhaust gas turbine by measurement and the amount of exhaust gas passed around the oxidation device by way of the bypass conduit is controlled in open-loop or closed-loop mode in dependence on that temperature.

It can also be provided that the exhaust gas temperature downstream of the oxidation device is ascertained by measurement of the combustion gas concentration before and after the oxidation device. In this embodiment the combustion gas concentration before and after the oxidation device is detected by measurement. The difference in concentration before and after the oxidation device gives the amount of converted combustion gas, from which in turn the increase in temperature across the oxidation device can be calculated. From that the exhaust gas temperature downstream of the oxidation device can be ascertained.

It is preferably provided that to protect a turbocharger arranged downstream of the oxidation device the amount of exhaust gas passed around the oxidation device by way of the bypass conduit is controlled in open-loop or closed-loop control mode such that a critical temperature of the exhaust gas turbine is not exceeded. The term critical temperature of the turbocharger is used to mean an exhaust gas temperature which, when it encounters the turbocharger, does not damage it due to an excessive speed of rotation or by virtue of exceeding the permissible component temperature. That critical temperature is dependent on the installed turbocharger and can be for example 650° C.

It is preferably provided that between about 30% and about 70%, preferably between about 40% and about 50%, of the exhaust gas is passed through the oxidation device while the remainder of the exhaust gas is passed through the bypass conduit. Good results were achieved with those values for regeneration of the oxidation device with at the same time protection for the turbocharger in relation to temperature peaks.

Particularly preferably it can be provided that during regeneration of the oxidation device a concentration of between at least 5000 and 7000 ppm of methane or a corresponding amount of methane equivalent is set in the mixture flowing into the oxidation device. With an NOx limit value of 500 mg NOx per Nm3 (stated as 5% O2-dry NOx) it has been found that a suitable level is for the oxidation device to be regenerated with a concentration of between about 5000 and 7000 ppm of methane or the corresponding methane equivalent.

When observing stricter limit values, for example 250 mg NOx/Nm3 it has proven to be advantageous if during regeneration a concentration of between at least 8000 and 10000 ppm of methane or a corresponding amount of methane equivalent is set in the mixture flowing into the oxidation device. That reflects the fact that, in the case of engine versions which have a very low concentration of NOx in the as-produced exhaust gas (that is to say prior to the exhaust gas aftertreatment operation), a lower exhaust gas temperature obtains before the oxidation device, than in the case of engine versions in which a higher NOx concentration is permitted in the as-produced exhaust gas. In order to reach the temperatures required for regeneration in the oxidation device it is therefore necessary to set a higher methane concentration in the case of engines operated particularly lean with a low level of untreated NOx emission, upstream of the oxidation device.

In the context of the present application the term methane equivalent is used to denote that amount of combustion gas which has the same energy content as a predetermined amount of methane. The concentrations specified for methane in this application therefore have to be corrected when using alternative combustion gases in accordance with their calorific value. Thus the calorific value of methane is 39.8 MJ/Nm$^3$; the calorific value of ethane is 70.3 MJ/Nm$^3$. Thus 2831 ppm of ethane correspond to the energy content of 5000 ppm of methane.

The concentration figures in ppm relate to the amount of substance or the volume (in the case of ideal gases equivalent). In the case of the above-mentioned ethane therefore only about half the concentration levels would be required. Calorific values of combustion gases can be viewed in relevant table textbooks.

It can be provided that the combustion gas feed is intermittently interrupted during regeneration of the oxidation device, the exhaust gas temperature is detected downstream of the oxidation device by means of a temperature sensor, the exhaust gas temperature upstream of the oxidation device is detected by means of a further temperature sensor and the degree of regeneration is established on the basis of the temperature difference. With this embodiment it can quickly be established whether regeneration has been completely effected. It is possible to establish on the basis of the temperature difference which occurs whether the oxidation device regains the desired conversion rate. For, a certain heat generation is linked to the conversion rate (that is to say the degree of oxidation of unburnt hydrocarbons). If the unburnt hydrocarbons in the exhaust gas are only inadequately converted the temperature after the oxidation device remains below an expected value. That is an indication that regeneration was not completely concluded. During the interruption in the feed of combustion gas the valve in the bypass conduit is closed and the valve downstream of the oxidation device is completely opened so that the entire exhaust gas mass flow flows through the oxidation device. That provides that flow conditions as in regular operation occur in the oxidation device and thus the measurement is representative.

In a further preferred embodiment it is provided that the exhaust gas temperature is detected downstream of the oxidation device by means of a temperature sensor, the exhaust gas temperature is detected upstream of the oxidation device by means of a further temperature sensor and the moment in time for the next regeneration operation is established on the basis of the ascertained temperature difference.

The above-discussed relationship can therefore be used to establish the interval between two regeneration operations. Therefore, by the stable temperature at the outlet of the oxidation device, which occurs after conclusion of a regeneration operation, the extent to which the oxidation device was regenerated is ascertained and thus the moment in time for the next regeneration operation is determined. In that respect further parameters detected by the engine management like operating time prior to regeneration, variation in temperature over the operating time, operating states, fuel quality and the like can naturally also be involved there.

Preferably it can be provided that the exhaust gas temperature downstream of the oxidation device is detected by means of the one temperature sensor downstream of the oxidation device, the exhaust gas temperature upstream of the oxidation device is detected by means of the further temperature sensor, and the moment in time for the next regeneration operation is established by on the one hand determining the conversion rate of the oxidation device from the temperature difference between downstream and upstream of the oxidation device, and on the other hand determining an expectation value for the temperature rise to be expected across the oxidation device from the temperature upstream of the oxidation device, that is detected by the temperature sensor upstream of the oxidation device.

Even more precisely than by way of the temperature difference alone, it is possible to infer the state of the oxidation device by way of additionally taking account of the temperature upstream of the oxidation device in combination with the temperature difference: the increase in untreated engine emissions correlates with a reduction in the exhaust gas temperature (detected by the temperature upstream of the oxidation device). By measuring that temperature therefore with a corresponding performance graph it is possible to ascertain the untreated emission of methane and thus the expected temperature rise across the oxidation device. That expectation value can then be compared to the actually measured difference between the measurement points downstream and upstream of the oxidation device and it is thus possible to infer the activity state of the catalyst.

The exhaust gas aftertreatment apparatus according to the invention is characterised in that the open-loop or closed-loop control device is adapted to control in open-loop or closed-loop mode the amount of exhaust gas passed around the oxidation device by way of the bypass conduit in dependence on an ascertained exhaust gas temperature downstream of the oxidation device.

It is preferably provided that the exhaust gas temperature downstream of the oxidation device can be ascertained by a temperature sensor arranged downstream of the oxidation device and upstream of the entry mouth of the bypass conduit. In that case therefore there is provided a temperature sensor disposed between the oxidation device and the entry mouth of the bypass conduit for measuring the exhaust gas temperature downstream of the oxidation device.

It can also be provided that the exhaust gas temperature downstream of the oxidation device can be ascertained by a temperature sensor arranged downstream of the entry mouth of the bypass conduit and before the entry mouth into the exhaust gas turbine. In this example the exhaust gas temperature can be ascertained by measurement before passing into the turbocharger.

In a further preferred embodiment it is provided that the exhaust gas temperature downstream of the oxidation device can be ascertained by means of the measuring device for measurement of the combustion gas concentration by measurement of the combustion gas concentration before and after the oxidation device. In this example there is provided a measuring device which can measure the combustion gas concentration before and after the oxidation device. It is possible to infer the exhaust gas temperature downstream of the oxidation device from the measurement values of that measuring device.

It can preferably be provided that the gas source is the fuel gas conduit. In this case the combustion gas required for regeneration is taken from the fuel gas conduit.

It can also be provided that the gas source is a gas supply separate from the fuel gas conduit, particularly preferably a gas bottle. That means that the combustion gas required for regeneration is taken from a separate gas source. That is linked to reduced investment costs in comparison with a connection to the gas supply conduit. It is naturally also possible for the above-mentioned gas sources for providing combustion gas for regeneration to be combined.

Figure 2:
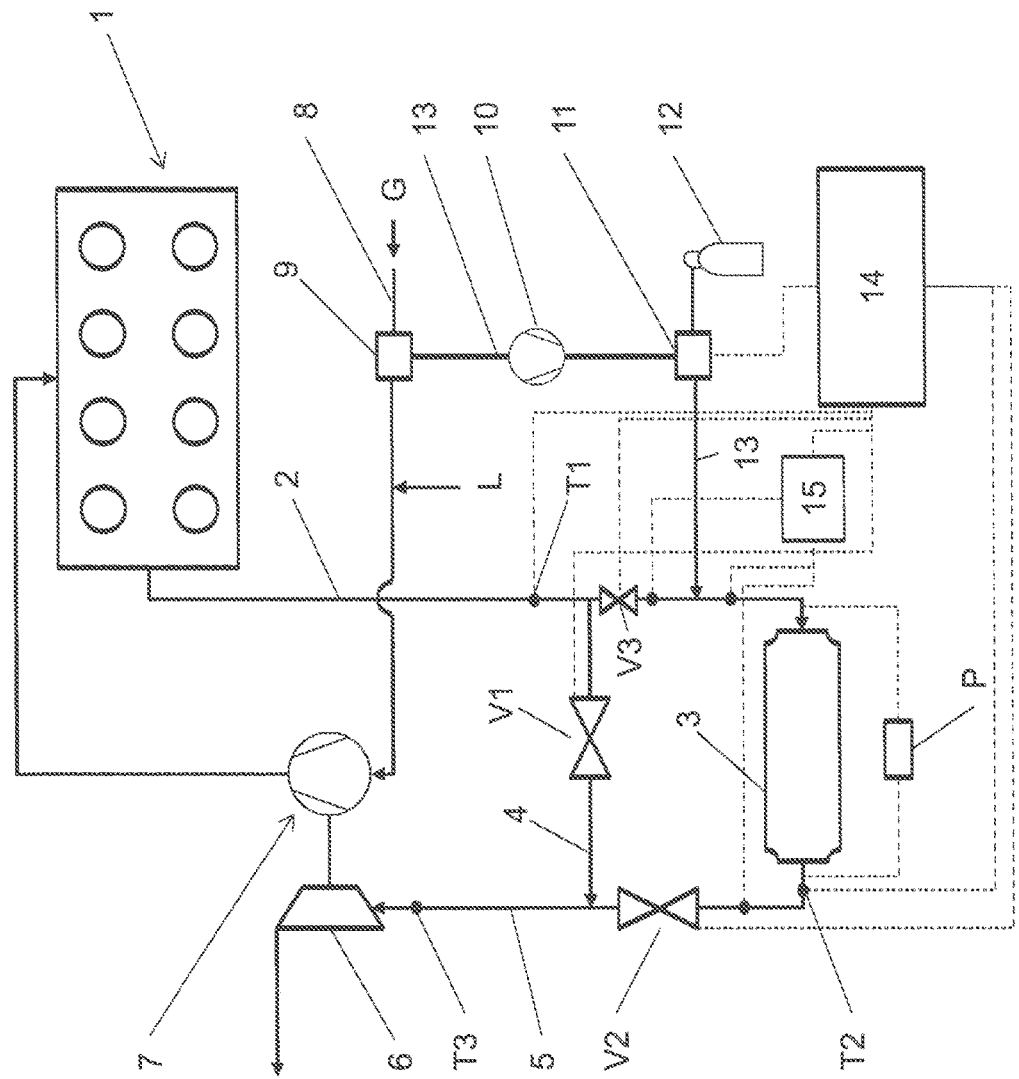

The invention is described in greater detail hereinafter by reference to Figures in which:

FIG. 1 shows a diagrammatic view of the exhaust gas aftertreatment apparatus, and FIG. 2 shows a diagrammatic view of the exhaust gas aftertreatment apparatus shown in FIG. 1 with additional measuring device.

FIG. 1 shows an internal combustion engine 1 with the exhaust gas manifold 2. The exhaust gases flow by way of the exhaust gas manifold 2 to the oxidation device 3.

The exhaust gases further flow by way of the exhaust gas conduit 5 to the exhaust gas turbine 6 of the turbocharger. The exhaust gases drive the exhaust gas turbine 6 which is connected to a compressor 7 by way of a shaft. The compressor 7 compresses mixture (combustion gas G and air L) or air L which is fed to the internal combustion engine 1 under increased pressure. A bypass conduit 4 which can be regulated by way of a valve V1 extends in flow relationship parallel to the oxidation device 3.

From the fuel gas supply 8 of the engine there is a branching 9, by way of which combustion gas G can be fed by way of the combustion gas feed conduit 13 upstream of the oxidation device 3. The combustion gas feed conduit 13 opens into the exhaust gas manifold 2 upstream of the oxidation device 3 and downstream of the branching 9 of the bypass conduit 4.

The combustion gas feed conduit 13 can be equipped with an additional compressor 10 if the gas supply of the engine has a pressure level lower than the pressure level in the exhaust gas manifold 2 of the internal combustion engine 1.

The Figure also shows a metering device 11 by which the amount of combustion gas fed to the oxidation device 3 can be controlled in open-loop or closed-loop mode by the open-loop or closed-loop control device 14.

The amount of exhaust gas which flows by way of the bypass conduit 4 can be established by way of a valve V1 actuable by the open-loop or closed-loop control device 14. A completely closed valve V1 means for example that no exhaust gas flows by way of the bypass 4.

The open-loop or closed-loop control device 14 maintains the concentration of combustion gas in the mixture of exhaust gas and combustion gas, that is fed to the oxidation device 3, constant at a fixed value range. In the event therefore of changes in the mass flow which is passed through the oxidation device 3 the open-loop or closed-loop control device 14 can suitably adapt the amount of combustion gas.

Optionally provided downstream of the oxidation device 3 is a further regulatable valve V2 which is arranged between the oxidation device 3 and before the entry of the bypass conduit 4 into the exhaust gas conduit 5.

A further optional valve V3 is arranged between the branching from the bypass conduit 4 and the entry mouth of the combustion gas feed conduit 13.

In the simplest case therefore the through-flow amount of exhaust gas through the bypass conduit 4 is subjected to open-loop or closed-loop control only by way of one valve, namely the valve V1. A complete diversion of the entire exhaust gas flow through the bypass conduit 4 is then certainly not possible even when the valve V1 is fully open as the flow path through the oxidation device 3 in fact still remains open. In practice however due to the higher flow resistance through the oxidation device than by way of the bypass conduit 4, with the valve V1 in the opened position, there is already a generally sufficient diversion of the exhaust gases through the bypass conduit 4.

In the variant with an additional valve V2 downstream of the oxidation device 3 it additionally becomes possible to throttle or entirely close off the flow through the oxidation device 3. By virtue of that measure regeneration in the oxidation device can advantageously be moderated. In that variant there is still the dynamic pressure of the exhaust gases in the exhaust gas manifold 2, that is applied to the oxidation device 3.

It is only upon the provision of the third valve V3 upstream of the oxidation device 3 between the branching of the bypass conduit 4 and the entry mouth of the combustion gas feed conduit 13 that it is possible for the oxidation device 3 to be completely closed off. In the variant involving the presence of the valve V3 moderation of the oxidation device 3 can be effected in particularly advantageous fashion for the valve V3 can provide that the amount of exhaust gas into the oxidation device 3 is throttled and the metering action in respect of combustion gas can be maintained independently thereof.

All variants, that is to say valve V1 alone, valve V1 with valve V2, valve V1 with valve V3, valve V1 with valve V2 and valve V3 can be technically implemented.

The combustion gas required for regeneration of the oxidation device 3, for example methane, can be taken from the fuel gas supply 8 of the internal combustion engine 1 and/or gas bottles 12.

In dependence on the required regeneration intervals which in turn depend on the gas quality and oil consumption, it may be sufficient for the gas supply for regeneration of the oxidation device 3 to be effected exclusively by way of gas bottles 12. In that case the capital investment costs are reduced in comparison with a system involving the fuel gas supply 8.

In dependence on an ascertained exhaust gas temperature downstream of the oxidation device 3 the amount of exhaust gas passed around the oxidation device 3 by way of the bypass conduit 4 is controlled in an open-loop or closed-loop control mode.

As described hereinbefore in the description the operation of ascertaining an exhaust gas temperature downstream of the oxidation device 3 can be effected for example by direct measurement of the exhaust gas temperature, for example by way of a temperature sensor T3 at the entry to the exhaust gas turbine 6. The amount of exhaust gas passed around the oxidation device 3 by way of the bypass conduit 4 is controlled in open-loop or closed-loop mode in dependence on that temperature detected by the temperature sensor T3, in such a way that the resulting mixture temperature of the combined mass flow portions from the bypass conduit 4 and the oxidation device 3 does not exceed a level which is damaging to the turbocharger.

The operation of ascertaining an exhaust gas temperature downstream of the oxidation device 3 can also be effected by measuring the temperature by means of a temperature sensor T2. The temperature sensor T2 is arranged in the exhaust gas conduit 5 after the oxidation device 3 but prior to the entry mouth of the bypass conduit 4. By open-loop/closed-loop control of the amount of exhaust gas passed around the oxidation device 3 by way of the bypass conduit 4 the ratio of the mass flow portions (amount of exhaust gas through the oxidation device 3 and amount of exhaust gas by way of the bypass conduit 4) is now so set that the resulting mixture temperature of the combined mass flow portions does not exceed a level damaging to the exhaust gas turbine 6. From knowledge of the valve position of valve V1 in the bypass conduit 4 the amount of exhaust gas flowing through the bypass conduit 4 is known and it is thus possible to infer the mixture temperature of the combined mass flow portions from the oxidation device 3 and the bypass conduit 4.

By virtue of the signals from the temperature sensor T2 at the exit of the oxidation device 3 it is also possible to infer the progress of regeneration and it is possible to recognize temperature peaks due to regeneration. The temperature sensor T2 at the exit of the oxidation device 3 is also an additional safety element. Thus the injection of combustion gas can be interrupted when a predefined temperature limit is exceeded. That temperature limit arises out of the maximum temperature permissible for the exhaust gas turbine 6 and a safety factor or from the maximum temperature permissible for the oxidation device 3.

The exhaust gas temperature downstream of the oxidation device 3 can therefore be ascertained at different positions of the exhaust gas conduit 5. The man skilled in the art is familiar with calculating therefrom the exhaust gas temperature upon passing into the exhaust gas turbine 6 as the temperature reduction over the extent of an exhaust gas conduit 5 is known.

The open-loop or closed-loop control device 14 is connected by way of signal lines (shown in broken line) to the sensors (temperature sensors T1 through T3, differential pressure measuring device P) or actuators (valves V1 through V3, metering device 11) and by way of those signal lines receives signals from the sensors or sends commands to the actuators by way of the signal lines. The open-loop or closed-loop control device 14 can be implemented by the engine management or in the form of an additional open-loop or closed-loop control device. In both cases it can receive and process engine signals. The signal connections to the internal combustion engine 1 are not shown.

A further temperature sensor T1 can be provided upstream of the oxidation device 3, to detect the exhaust gas temperature of the untreated exhaust gas.

As the untreated engine emissions correlate with the exhaust gas temperature (detected by the temperature at T1) it is possible by measurement of that temperature with a corresponding performance graph to ascertain the untreated emission of methane and thus the expected temperature rise across the oxidation device.

The temperature sensors T1 through T3 are in signal communication with the open-loop or closed-loop control device 14, the connections are not shown for the sake of clarity of the drawing.

The differential pressure measuring device P is also shown but is only optionally provided. That detects the exhaust gas counterpressure built up by way of the oxidation device 3 and provides indications in relation to the flow conditions in the oxidation device 3. The differential pressure measuring device P is in signal communication with the open-loop or closed-loop control device 14; the connections are now shown for the sake of clarity of the drawing.

The combustion gas which is injected upstream of the oxidation device is mixed with the exhaust gas so that the oxidation device 3 receives an afflux flow formed by a gas mixture of uniform concentration over the entire cross-section. That is of particular significance for the reason that local peaks in combustion gas concentrations locally cause excessive heat development at the oxidation device 3 and can thermally damage same. On the other hand regions of the oxidation device 3 at which the combustion gas concentration is lower than the concentration necessary for regeneration would be only inadequately regenerated. The amount of combustion gas which is injected into the exhaust gas is subjected to open-loop or closed-loop control by the open-loop or closed-loop control device 14 by way of the metering device 11.

FIG. 2 shows a diagrammatic view corresponding to FIG. 1, wherein there is additionally provided a measuring device for measuring the combustion gas concentration 15 upstream of the oxidation device 3.

The concentration of combustion gas before and after the oxidation device 3 and optionally also additionally before the combustion gas feed position is detected by the concentration measuring device 15. The conversion rate of the catalyst can be determined by the concentration measuring device 15 in order to establish the regeneration intervals. For, the amount of converted combustion gas arises out of the difference in concentration of combustion gas before and after the oxidation device 3. As described hereinbefore it is also possible to calculate therefrom the increase in temperature across the oxidation device 3.

Thus by way of that variant it is also possible to ascertain an exhaust gas temperature downstream of the oxidation device 3, in dependence on which the amount of exhaust gas which is passed around the oxidation device 3 by way of the bypass conduit 4 is subjected to open-loop or closed-loop control such that the exhaust gas temperature before the turbocharger does not assume any damaging values for the turbocharger.

By means of the hydrocarbon concentration before and after the injection point and the exhaust gas mass flow which is known from the engine management, it is possible to check whether in actual fact the desired exhaust gas flow is flowing through the catalyst (checking of the valve function) or whether the metering device meters the desired amount of methane (checking of the metering device function).

In order to precisely set the required combustion gas concentration upstream of the oxidation device 3 the hydrocarbon concentration upstream of the injection point is detected by way of the measuring device 15.

A suitable measuring method is for example using a flame ionization detector or FID. It will be noted however that this measure is not absolutely necessary for in operation the hydrocarbon concentration in the exhaust gas fluctuates only to a slight degree or can be correlated with sufficient accuracy with the exhaust gas temperature by way of a performance graph stored in the open-loop or closed-loop control device 14. In other words, even if the combustion gas concentration upstream of the catalyst during the regeneration operation should be for example 5500 ppm instead of the desired 5000 ppm neither the oxidation device 3 nor the turbocharger 6 suffer damage. Another task of the measuring device for measuring the combustion gas concentration 15 is to check whether the injected combustion gas is distributed uniformly over the cross-sectional area of the oxidation device 3. For that purpose it is possible to provide concentration measuring probes at various radial positions of the oxidation device 3 (not shown in detail).

It will be appreciated that the variants and details described in relation to FIG. 1 also apply to the embodiment of FIG. 2. The operation of ascertaining an exhaust gas temperature downstream of the oxidation device 3 can be effected in accordance with the described variants or in combination thereof.

LIST OF REFERENCES USED 1 internal combustion engine
2 exhaust gas manifold
3 oxidation device
4 bypass conduit
5 exhaust gas conduit
6 exhaust gas turbine
7 compressor
8 fuel gas supply
9 branching
10 compressor
11 metering device
12 gas bottle
13 combustion gas feed conduit
14 open-loop or closed-loop control device
15 measuring device for measuring the combustion gas concentration
L combustion-supporting air
G combustion gas
P differential pressure measuring device
V1, V2, V3 valves
T1, T2, T3 temperature sensors

The invention claimed is:

1. A method of regenerating an oxidation device of an internal combustion engine, in particular a stationary internal combustion engine, wherein the oxidation device is connected downstream of the internal combustion engine, comprising
feeding a mixture of combustion gas and exhaust gas to the oxidation device to increase a temperature in the oxidation device,
passing exhaust gas around the oxidation device by way of a bypass conduit,
selectively controlling the amount of exhaust gas passed around the oxidation device by way of the bypass conduit in open-loop or closed-loop control mode in dependence on an ascertained exhaust gas temperature downstream of the oxidation device to protect an exhaust gas turbine arranged downstream of the oxidation device such that a critical temperature of the exhaust gas turbine is not exceeded.

2. A method as set forth in claim 1, further comprising ascertaining the exhaust gas temperature downstream of the oxidation device by a temperature sensor arranged downstream of the oxidation device and upstream of an entry mouth of the bypass conduit.

3. A method as set forth in claim 1, further comprising ascertaining the exhaust gas temperature downstream of the oxidation device by a temperature sensor arranged downstream of an entry mouth of the bypass conduit and before an entry mouth into the exhaust gas turbine.

4. A method as set forth in claim 1, further comprising ascertaining the exhaust gas temperature downstream of the oxidation device by measurement of a concentration of the combustion gas before and after the oxidation device.

5. A method as set forth in claim 1, wherein between about 30% and about 70%, preferably between about 40% and about 50%, of the exhaust gas is passed through the oxidation device while a remainder of the exhaust gas is passed through the bypass conduit.

6. A method as set forth in claim 1, wherein during regeneration a concentration of between at least 5000 and 7000 ppm of methane or a corresponding amount of methane equivalent is set in the mixture of combustion gas and exhaust gas flowing into the oxidation device.

7. A method as set forth in claim 1, wherein during regeneration a concentration of between at least 8000 and 10000 ppm of methane or a corresponding amount of methane equivalent is set in the mixture of combustion gas and exhaust gas flowing into the oxidation device.

8. A method as set forth in claim 1, further comprising intermittently interrupting the combustion gas feed during regeneration of the oxidation device, detecting the exhaust gas temperature downstream of the oxidation device by means of a first temperature sensor, detecting the exhaust gas temperature upstream of the oxidation device by means of a second temperature sensor, and establishing a degree of regeneration on a basis of a temperature difference between the exhaust gas temperature downstream and the exhaust gas temperature upstream.

9. A method as set forth in claim 1, further comprising detecting the exhaust gas temperature downstream of the oxidation device by means of a first temperature sensor, detecting the exhaust gas temperature upstream of the oxidation device by means of a second temperature sensor, and establishing a moment in time for a next regeneration operation on a basis of an ascertained temperature difference between the exhaust gas temperature downstream and the exhaust gas temperature upstream.

10. A method as set forth in claim 6, further comprising detecting the exhaust gas temperature downstream of the oxidation device by means of a first temperature sensor, detecting the exhaust gas temperature upstream of the oxidation device by means of a second temperature sensor, and establishing a moment in time for a next regeneration operation by
on the one hand determining a conversion rate of the oxidation device from a temperature difference between the exhaust gas temperature downstream and the exhaust gas temperature upstream, and
on the other hand determining an expectation value for a temperature rise to be expected across the oxidation device from the exhaust gas temperature upstream of the oxidation device, that is detected by the first temperature sensor upstream of the oxidation device.

11. An exhaust gas aftertreatment apparatus for an internal combustion engine, in particular a stationary internal combustion engine, comprising an open-loop or closed-loop control device, an exhaust gas turbine and an oxidation device for exhaust gases, that is arranged upstream of the exhaust gas turbine, wherein exhaust gases from the internal combustion engine are passed around the oxidation device by way of a bypass conduit and wherein a connection to a gas source is provided in an exhaust gas manifold upstream of the oxidation device and a mixture of combustion gas originating from the gas source and exhaust gas is fed to the oxidation device, wherein the open-loop or closed-loop control device is adapted to selectively control in open-loop or closed-loop mode an amount of exhaust gas passed around the oxidation device by way of the bypass conduit in dependence on an ascertained exhaust gas temperature downstream of the oxidation device to protect an exhaust gas turbine arranged downstream of the oxidation device such that a critical temperature of the exhaust gas turbine is not exceeded.

12. An exhaust gas aftertreatment apparatus as set forth in claim 11, wherein the exhaust gas temperature downstream of the oxidation device is ascertained by a temperature sensor arranged downstream of the oxidation device and upstream of an entry mouth of the bypass conduit.

13. An exhaust gas aftertreatment apparatus as set forth in claim 11, wherein the exhaust gas temperature downstream of the oxidation device is ascertained by a temperature sensor arranged downstream of an entry mouth of the bypass conduit and before an entry mouth into the exhaust gas turbine.

14. An exhaust gas aftertreatment apparatus as set forth in claim 11, wherein the exhaust gas temperature downstream of the oxidation device is ascertained by means of a measuring device for measurement of a concentration of the mixture of combustion gas by measurement of the concentration of the mixture of combustion gas before and after the oxidation device.

15. An exhaust gas aftertreatment apparatus as set forth in claim 11, wherein the gas source is a fuel gas conduit.

16. An exhaust gas aftertreatment apparatus as set forth in claim 11, wherein the gas source is a gas supply separate from a fuel gas conduit, particularly preferably a gas bottle.

* * * * *